United States Patent
Igarashi et al.

(10) Patent No.: US 8,759,447 B2
(45) Date of Patent: Jun. 24, 2014

(54) COMPATIBILIZER AND METHOD FOR PRODUCING SAME

(75) Inventors: Takeyuki Igarashi, Kurashiki (JP); Shinji Tai, Kurashiki (JP); Tomoyuki Watanabe, Zwijndrecht (BE)

(73) Assignee: Kuraray Co., Ltd., Kurashiki-shi (JP)

( * ) Notice: Subject to any disclaimer, the term of this patent is extended or adjusted under 35 U.S.C. 154(b) by 116 days.

(21) Appl. No.: 13/499,831

(22) PCT Filed: Sep. 30, 2010

(86) PCT No.: PCT/JP2010/067077
§ 371 (c)(1),
(2), (4) Date: Apr. 2, 2012

(87) PCT Pub. No.: WO2011/040523
PCT Pub. Date: Apr. 7, 2011

(65) Prior Publication Data
US 2012/0196970 A1   Aug. 2, 2012

(30) Foreign Application Priority Data
Oct. 2, 2009  (JP) ................................ 2009-231008

(51) Int. Cl.
*C08L 23/26*    (2006.01)
*C08L 29/04*    (2006.01)
*C08F 216/06*   (2006.01)

(52) U.S. Cl.
USPC ............. 525/187; 525/57; 525/185; 525/195; 525/196; 524/503; 428/523

(58) Field of Classification Search
USPC ........... 525/57, 187, 195, 196, 216, 221, 185; 428/523; 524/503
See application file for complete search history.

(56) References Cited

U.S. PATENT DOCUMENTS

| | | | |
|---|---|---|---|
| 5,278,229 A | 1/1994 | Asano et al. | |
| 2008/0268737 A1 | 10/2008 | Hartl et al. | |
| 2008/0293886 A1 | 11/2008 | Karl et al. | |
| 2010/0119856 A1 | 5/2010 | Igarashi et al. | |

FOREIGN PATENT DOCUMENTS

| | | |
|---|---|---|
| JP | 6 179752 | 6/1994 |
| JP | 7 292172 | 11/1995 |
| JP | 8 291247 | 11/1996 |
| JP | 2002 121342 | 4/2002 |
| JP | 2005 272793 | 10/2005 |
| JP | 2007 70491 | 3/2007 |
| JP | 2008 115367 | 5/2008 |
| JP | 2008 542485 | 11/2008 |
| JP | 2008 542561 | 11/2008 |
| WO | 2008 123426 | 10/2008 |

OTHER PUBLICATIONS

International Search Report Issued Nov. 30, 2010 in PCT/JP10/67077 Filed Sep. 30, 2010.
Extended European Search Report issued on Apr. 25, 2013 in Application No. 10820638.4.

*Primary Examiner* — Fred M Teskin
(74) *Attorney, Agent, or Firm* — Oblon, Spivak, McClelland, Maier & Neustadt, L.L.P.

(57) ABSTRACT

A compatibilizer contains a polymer (A) obtained by reacting a modified olefin-based polymer (a-1) with a polymer (a-2) containing a terminal functional group, wherein the modified olefin-based polymer (a-1) is a polymer modified with from 0.01 to 2 mass % of unsaturated carboxylic acid or a derivative thereof, and the polymer (a-2) is a ring opening polymer or condensation polymer containing a terminal functional group, capable of reacting with the modified olefin-based polymer (a-1), at both ends or one end thereof and has a number average molecular weight from 1,500 to 100,000. This provides an excellent compatibilizer. Particularly, upon melt processing a recovery of a multilayer structure including an EVOH layer and a thermoplastic resin layer, a recycling agent is provided that gives sufficient improvement effects to any of the adhesion of a degraded resin to a screw of a molding machine, the generation of die build-up, the generation of fish eyes, and the decrease in transparency.

19 Claims, No Drawings

COMPATIBILIZER AND METHOD FOR PRODUCING SAME

This application is a 371 of PCT/JP10/67077, filed Sep. 30, 2010. Priority to Japanese patent application 2009-231008, filed Oct. 2, 2009, is claimed.

TECHNICAL FIELD

The present invention relates to a compatibilizer, and particularly to a recycling agent used preferably for reusing a recovery of a multilayer structure including an ethylene-vinyl alcohol copolymer layer and a thermoplastic resin layer.

BACKGROUND ART

Conventionally, multilayer structures containing an ethylene-vinyl alcohol copolymer (hereinafter, may be referred to as EVOH) layer and a thermoplastic resin layer are molded into a film, a sheet, a cup, a tray, a bottle, and the like, and taking advantage of properties thereof, are used for various uses, such as a packaging material for foods and medicines. It is widely carried out to collect wastes, chips, and defective products generated when obtaining various molded articles from such a multilayer structure including an EVOH layer and a thermoplastic resin layer, trash after using the various molded articles, and the like and to reuse the recovery from the perspective of reduction of wastes and the economic efficiency.

However, when melt processing a recovery of a multilayer structure including an EVOH layer and a thermoplastic resin layer, there has sometimes been problems that the EVOH reacts with an adhesive resin contained in the recovery for gelation, a degraded resin adheres to a screw or a cylinder of a molding machine, or a phase separation foreign matter (hereinafter, may be referred to as die build-up) is generated at a die lip, thereby generating a burnt deposit or a fish eye or decreasing the transparency in a resin molded article obtained therefrom.

In an attempt to improve the problems, a technique is proposed that prevents generation of the die build-up by blending a resin composition containing an acid grafted polyolefin-based resin, a fatty acid metal salt, and/or a specific metal compound in a recovery (Patent Document 1). A technique is also proposed that inhibits the generation of fish eyes, the generation of die build-up, the decrease in transparency, and the like by blending a resin composition containing an acid grafted modified polyolefin-based resin and polyol in a recovery (Patent Document 2). An additive thus blended when melt kneading a recovery of a multilayer structure is called as a recycling agent. However, the present inventors have reviewed the techniques to find that the technique described in Patent Document 1 has an insufficient effect of inhibiting the generation of die build-up and the generation of fish eyes and the technique described in Patent Document 2 has an insufficient effect of improving the transparency.

In contrast, as an adhesive composition to a polar resin, such as EVOH, known is a composition mixing a ring opening polymer or condensation polymer component containing a hydroxyl group or an amino group at both ends or one end with a resin having a carboxylic acid anhydride or a derivative thereof component (Patent Document 3). However, usage of the adhesive composition as a recycling agent is not reviewed at all.

PRIOR ART DOCUMENTS

Patent Documents

Patent Document 1: JP 2002-121342A
Patent Document 2: JP 2008-115367A
Patent Document 3: WO 2008/123426

SUMMARY OF THE INVENTION

Problems to be Solved by the Invention

It is an object of the present invention to provide an excellent compatibilizer and a method of producing the same. In particular, upon melt processing a recovery of a multilayer structure including a polar resin layer, such as EVOH, and a thermoplastic resin layer, it is to provide a recycling agent giving sufficient improvement effects to any of the adhesion of a degraded resin to a screw of a molding machine, the generation of die build-up, the generation of fish eyes, and the decrease in transparency.

Means for Solving the Problems

As a result of intensive studies to solve the problems, the present inventors have found that the problems can be solved by a compatibilizer containing a polymer obtained by reacting a specific modified olefin-based polymer with a polymer containing a specific terminal functional group. Particularly, the problems can be solved by a recycling agent comprising the compatibilizer to complete the present invention.

That is, the present invention is to provide the following [1] through [12].

[1] A compatibilizer, comprising a polymer (A) obtained by reacting a modified olefin-based polymer (a-1) with a polymer (a-2) containing a terminal functional group, wherein the modified olefin-based polymer (a-1) is a polymer modified with from 0.01 to 2 mass % of unsaturated carboxylic acid or a derivative thereof, and the polymer (a-2) is a polymer containing a terminal functional group, capable of reacting with the modified olefin-based polymer (a-1), at both ends or one end thereof and has a number average molecular weight from 1,500 to 100,000.

[2] The compatibilizer according to [1], wherein an amount of the terminal functional group is from 0.1 to 50 mol % in the polymer (a-2) based on an amount of a functional group derived from the unsaturated carboxylic acid or the derivative thereof in the modified olefin-based polymer (a-1).

[3] The compatibilizer according to [1] or [2], wherein the polymer (a-2) has an SP value, calculated from the Fedors equation, of from 9 to 15 $(cal/cm^3)^{1/2}$

[4] The compatibilizer according to any one of [1] through [3], wherein the terminal functional group contained in the polymer (a-2) is a hydroxyl group.

[5] The compatibilizer according to any one of [1] through [4], wherein the polymer (a-2) contains the terminal functional group only at one end thereof.

[6] The compatibilizer according to [5], wherein the polymer (a-2) is polyglycol having one end capped with ether or ester.

[7] The compatibilizer according to any one of [1] through [6], further comprising an alkali metal compound (B).

[8] The compatibilizer according to [7], wherein the alkali metal compound (B) is contained in a ratio from 0.1 to 10 mol % in terms of alkali metal elements based on the functional group derived from the unsaturated carboxylic acid or the derivative thereof in the modified olefin-based polymer (a-1).

[9] The compatibilizer according to any one of [1] through [8], further comprising an unmodified olefin-based polymer.
[10] The compatibilizer according to any one of [1] through [9], wherein the unreacted polymer (a-2) is not substantially contained.
[11] A recycling agent comprising the compatibilizer according to any one of [1] through [10].
[12] A mixed resin, comprising: a recovery of a multilayer structure including an ethylene-vinyl alcohol copolymer layer and a thermoplastic resin layer; and the recycling agent according to [11], wherein the recycling agent is contained from 0.5 to 10 mass %.
[13] A multilayer structure, comprising at least one layer obtained by melt processing the mixed resin according to [12].
[14] A method of producing the compatibilizer according to any one of [1] through [10], the method comprising the step of melt kneading the modified olefin-based polymer (a-1) and the polymer (a-2).
[15] The method of producing the compatibilizer according to [14], wherein from 0.1 to 200 parts by mass of the polymer (a-2) is melt kneaded based on 100 parts by mass of the modified olefin-based polymer (a-1).
[16] The method of producing the compatibilizer according to [14] or [15], wherein the modified olefin-based polymer (a-1) and the polymer (a-2) are melt kneaded in the presence of the alkali metal compound (B).

Effects of the Invention

According to the present invention, it is possible to provide an excellent compatibilizer and a method of producing the same. In particular, it is possible to provide a recycling agent giving sufficient improvement effects to any of the adhesion of a degraded resin to a screw of a molding machine, the generation of die build-up, the generation of fish eyes, and the decrease in transparency.

MODE FOR CARRYING OUT THE INVENTION

A detailed description is given below to the present invention. A compatibilizer of the present invention contains a polymer (A) obtained by reacting a modified olefin-based polymer (a-1) with a polymer (a-2) containing a terminal functional group.

A part derived from an olefin-based polymer being a main backbone of the modified olefin-based polymer (a-1) in the polymer (A) is compatible with a thermoplastic resin, and a functional group derived from unsaturated carboxylic acid or a derivative thereof in the modified olefin-based polymer (a-1) remaining in the polymer (A) reacts with EVOH, and further a part derived from the polymer (a-2) is compatible with EVOH, so that the compatibilizer of the present invention containing the polymer (A) functions as an excellent compatibilizer to a recovery of a multilayer structure including an EVOH layer and a thermoplastic resin layer.

[Modified Olefin-Based Polymer (a-1)]

The modified olefin-based polymer (a-1) used for the present invention is an olefin-based polymer modified with from 0.01 to 2 mass % of unsaturated carboxylic acid or a derivative thereof.

The olefin-based polymer being a main backbone of the modified olefin-based polymer (a-1) is a polymer mainly made of carbon and hydrogen, and as long as not inhibiting the effects of the present invention, may also contain a bond, such as an ether bond, an ester bond, and an amide bond.

The olefin-based polymer may include, for example, homopolymers of α-olefin, such as polyethylene, polypropylene, polybutene, poly(4-methyl)pentene, polyhexene, polyoctene, polydecene, and polydodecene; and random copolymers of α-olefin, such as an ethylene/propylene copolymer, an ethylene/butene copolymer, and a propylene/butene copolymer. These olefin-based polymers can be used in one type singly or in combination of two types or more.

The olefin-based polymer may also contain, as long as not inhibiting the effects of the present invention, conjugated diene, such as isoprene, butadiene, and octadiene, and a compound containing an aromatic group or a functional group, such as styrene, acrylonitrile, and vinyl acetate, as a copolymer component of α-olefin. It is also possible to contain a metathesis polymer like polyoctenylene and a ring opening metathesis polymer, such as cyclooctadiene. Since thermal stability becomes worse when many double bonds are contained in the main chain of polyolefin, the double bonds are preferably hydrogenated from the perspective of thermal stability improvement. Examples of the olefin-based polymer containing styrene as a copolymer component may include block copolymers, such as a styrene-(ethylene/butene)-styrene triblock copolymer and a styrene-isobutylene-styrenetri-block copolymer, having polystyrene blocks bonded to the homopolymer or the random copolymer of α-olefin.

The unsaturated carboxylic acid or a derivative thereof used for the modification is a compound capable of an esterification or transesterification reaction with hydroxyl groups of EVOH, and may include, for example, maleic anhydride, citraconic anhydride, 2,3-dimethylmaleic anhydride, bromomaleic anhydride, chloromaleic anhydride, dichloromaleic anhydride, glutaconic anhydride, and the like. These unsaturated carboxylic acids or derivatives thereof can be used in one type singly or in combination of two types or more. Among the unsaturated carboxylic acids or derivatives thereof, from the perspective of availability and the like, maleic anhydride is most preferred.

An amount of modification of the modified olefin-based polymer (a-1) is from 0.01 to 2 mass %, preferably from 0.02 to 1.8 mass %, and more preferably from 0.1 to 1.5 mass %. When the amount of modification is less than 0.01 mass %, the effects of the present invention is not sufficiently obtained probably due to the too small amount of reaction of the polymer (A) and the EVOH. In contrast, a case of more than 2 mass % causes an excessive reaction of the polymer (A) and the EVOH or increases the ratio of a cross-linking reaction by the functional groups derived from the unsaturated carboxylic acid or a derivative thereof. Particularly in a case of using the compatibilizer as a recycling agent, fish eyes are prone to be generated. The amount of modification herein means a ratio of the mass of the unsaturated carboxylic acid or a derivative thereof based on the mass of the modified olefin-based polymer (a-1).

A method of modifying the olefin-based polymer with the unsaturated carboxylic acid or a derivative thereof is not particularly limited, and for example, the modified olefin-based polymer (a-1) can be obtained by activating the olefin-based polymer with peroxide or a radical initiator and graft reacting the unsaturated carboxylic acid or a derivative thereof at the active site. Although it is also possible to obtain the modified olefin-based polymer (a-1) by copolymerizing the unsaturated carboxylic acid or a derivative thereof with the α-olefin, from the perspective of the reactivity with the polymer (a-2) and the EVOH, the modified olefin-based polymer (a-1) is preferably a graft modified olefin-based polymer.

Although the melt flow rate (MFR) (230° C., under the load of 2160 g) of the modified olefin-based polymer (a-1) is not particularly limited, it is preferably from 0.4 to 200 g/10 min.

[Polymer (a-2) containing Terminal Functional Group]

The polymer (a-2) containing a terminal functional group used for the present invention is a polymer containing a terminal functional group, capable of reacting with the modified olefin-based polymer (a-1), at both ends or one end thereof and has a number average molecular weight from 1,500 to 100,000.

It is preferred that the polymer (a-2) has an SP value, calculated from the Fedors equation, within a range from 9 to 15 $(cal/cm^3)^{1/2}$. When the SP value is less than 9 $(cal/cm^3)^{1/2}$ the affinity for the EVOH at the part derived from the polymer (a-2) in the polymer (A) decreases, so that the compatibilizing effect becomes insufficient. Also in a case of more than 15 $(cal/cm^3)^{1/2}$, the affinity for the EVOH at the part derived from the polymer (a-2) similarly decreases, so that the compatibilizing effect becomes insufficient. In order to increase the compatibilizing effect of the compatibilizer (A), the polymer (a-2) more preferably has an SP value within a range from 10 to 14 $(cal/cm^3)^{1/2}$ and even more preferably from 11 to 13 $(cal/cm^3)^{1/2}$. Here, the SP value is obtained in a method described in "Polymer Engineering and Science, Vol. 14, No. 2, p 147 through 154 (1974)". The modified olefin-based polymer (a-1), which is polyolefin, normally has an SP value of less than 9.

As the polymer (a-2), a ring opening polymer or a condensation polymer containing a terminal functional group capable of reacting with the modified olefin-based polymer (a-1) at both ends or one end thereof is used preferably. The ring opening polymer or the condensation polymer may include, for example, polyglycols, such as polyethylene glycol and polypropylene glycol obtained by a ring opening polymerization of epoxide, such as ethylene oxide and propylene oxide, or by a condensation polymerization of glycol, such as ethylene glycol and propylene glycol; and polymers obtained by a ring opening polymerization of cyclohexene, cyclooctene, or a derivative thereof and being capped with alcohol. These ring opening polymers or condensation polymers can be used in one type singly or in combination of two types or more.

As the terminal functional group, capable of reacting with the modified olefin-based polymer (a-1), contained in the polymer (a-2), there are a hydroxyl group, an amino group, and a thiol group. When the terminal functional group is an amino group or a thiol group, the color of a resin with the compatibilizer added thereto sometimes becomes worse, so that it is preferred that the terminal functional group is a hydroxyl group.

The polymer (a-2) preferably contains the terminal functional group capable of reacting with the modified olefin-based polymer (a-1) only at one end thereof because the part derived from the polymer (a-2) of the polymer (A) acts as a lubricant. In particular, it is preferred in a case of using the compatibilizer as a recycling agent, because it acts as a lubricant in an extruder to inhibit the adhesion of a degraded resin to a screw. Further, also from the perspective of an assumption that, when containing a terminal functional group at both ends thereof, the polymer (a-2) acts as a cross-linker to be prone to cause excessive cross-linking, it is preferred that the polymer (a-2) contains the terminal functional group only at one end thereof.

The polymer (a-2) containing the terminal functional group capable of reacting with the modified olefin-based polymer (a-1) only at one end thereof may include polyglycols having one end without a hydroxyl group, for example: polyglycol ether having one end capped with ether, such as polyethylene glycol monomethyl ether and polyethylene glycol monoethyl ether; and polyglycol ester having one end capped with ester, such as polyethylene glycol monoacetate. In addition, a polymer having one end capped with ether or ester, after a ring opening polymerization of cyclohexene, cyclooctene, or a derivative thereof and capping with alcohol, and the like can also be used.

The polymer (a-2) has a number average molecular weight (Mn) from 1,500 to 100,000, preferably from 2,000 to 20,000, more preferably from 2,500 to 15,000, and even more preferably from 3,000 to 10,000. When the number average molecular weight is less than 1,500, the performance of compatibilization is decreased. Particularly in a case of using the compatibilizer as a recycling agent, it is prone to decrease the effect of inhibiting the adhesion of a degraded resin to a screw or decrease the effect of inhibiting the generation of die build-up. In contrast, when the number average molecular weight is more than 100,000, the reaction of the modified olefin-based polymer (a-1) and the polymer (a-2) becomes insufficient or the reaction of the EVOH and the functional group derived from the unsaturated carboxylic acid or a derivative thereof in the modified olefin-based polymer (a-1) remaining in the polymer (A) is inhibited. Particularly in a case of using the compatibilizer as a recycling agent, the effect of inhibiting the generation of die build-up sometimes decreases.

[Polymer (A)]

By reacting the modified olefin-based polymer (a-1) with the polymer (a-2) containing a terminal functional group, the polymer (A) is obtained.

Since a part derived from the olefin-based polymer, which is a main backbone of the modified olefin-based polymer (a-1), in the polymer (A) is compatible with a thermoplastic resin, and a functional group derived from the unsaturated carboxylic acid or a derivative thereof in the modified olefin-based polymer (a-1) remaining in the polymer (A) reacts with the EVOH, and further a part derived from the polymer (a-2) is compatible with the EVOH, the compatibilizer of the present invention is excellent in the effect of improving compatibility between the EVOH and a thermoplastic resin.

The polymer (A) is preferably a polymer having an amount of the terminal functional groups in the polymer (a-2), that is, an amount of reaction of the terminal functional groups from 0.1 to 50 mol % based on an amount of the functional groups derived from the unsaturated carboxylic acid or a derivative thereof in the modified olefin-based polymer (a-1). The above ratio is more preferably from 0.5 to 30 mol %, even more preferably from 2 to 20 mol %, and most preferably from 5 to 15 mol %. When the ratio is less than 0.1 mol %, there is no effect of reacting the polymer (a-2). Particularly in a case of using the compatibilizer as a recycling agent, the effect of inhibiting adhesion of a degraded resin to a screw is prone to decrease. In contrast, when more than 50 mol %, there is a risk of inhibiting the reaction of the EVOH and the functional group derived from the unsaturated carboxylic acid or a derivative thereof in the modified olefin-based polymer (a-1) remaining in the polymer (A) and decreasing the effect of compatibilization. Particularly in a case of using the compatibilizer as a recycling agent, the effect of inhibiting the generation of fish eyes is prone to decrease. A method of measuring an amount of reaction of the terminal functional groups in the polymer (a-2) based on the amount of the functional groups derived from the unsaturated carboxylic acid or a derivative thereof in the modified olefin-based polymer (a-1) may include, for example, a method of measuring an amount of the functional groups derived from the unreacted unsaturated carboxylic acid in the polymer (A) and an amount of the functional groups derived from the unsaturated carboxylic acid in the modified olefin-based polymer (a-1) not reacted with the polymer (a-2) by titration using an ethanolic potassium hydroxide solution to obtain from a difference therebetween and a method of measuring an amount of carboxyl groups in the functional groups derived from the unsaturated carboxylic acid or a derivative thereof in the modified olefin-based polymer (a-1) reacted with the terminal functional groups in the polymer (a-2) in a $C^{13}$-NMR measurement.

A method of reacting the modified olefin-based polymer (a-1) with the polymer (a-2) is not particularly limited, and may include, for example: a method of reacting the polymer (a-2) after preparing the modified olefin-based polymer (a-1) in advance by modifying the olefin-based polymer with the unsaturated carboxylic acid or a derivative thereof; and a method of reacting the modified olefin-based polymer (a-1) with the polymer (a-2) by modifying the olefin-based polymer with the unsaturated carboxylic acid or a derivative thereof in the presence of the polymer (a-2) at the same time.

The polymer (A) is preferably obtained by melt kneading the modified olefin-based polymer (a-1) and the polymer (a-2) to react both of them. It is preferred that the modified olefin-based polymer (a-1) and the polymer (a-2) are melt kneaded in the presence of an alkali metal compound (B) because the reaction is accelerated. A preferred kneading temperature is within a range from 150° C. to 300° C. When the kneading temperature is more than 300° C., there is a risk of thermally degrading the modified olefin-based polymer (a-1) and the polymer (a-2). In contrast, when less than 150° C., there is a risk that the reaction of the modified olefin-based polymer (a-1) and the polymer (a-2) does not proceed sufficiently. From the perspective of the performance of the compatibilizer, the kneading temperature is more preferably from 180° C. to 250° C., even more preferably from 190° C. to 240° C., and most preferably from 200° C. to 230° C.

The compatibilizer of the present invention may also be made only of the polymer (A) and may also contain another component in addition to the polymer (A). A content of the polymer (A) in the compatibilizer is preferably 5 mass % or more, and more preferably 10 mass % or more. In a case of diluting the polymer (A) with an unmodified olefin-based polymer, the content of the polymer (A) in the compatibilizer is preferably 90 mass % or less, and more preferably 80 mass % or less.

[Alkali Metal Compound (B)]

The compatibilizer of the present invention may also contain the alkali metal compound (B) together with the polymer (A). It is preferred that the modified olefin-based polymer (a-1) and the polymer (a-2) are reacted in the presence of the alkali metal compound (B) because the reaction can be accelerated.

As the alkali metal compound (B), a basic substance, such as a hydroxide, a carbonate, and a lower fatty acid salt of an alkali metal, is used preferably and it may include, for example, sodium hydroxide, potassium hydroxide, sodium carbonate, calcium carbonate, sodium hydrogencarbonate, potassium hydrogencarbonate, potassium acetate, potassium butyrate, and the like. Among them, potassium acetate is used preferably from the perspective of reactivity and toxicity. In a case of the alkali metal compound (B) being a fatty acid salt, it is preferred to be lower fatty acid having a carbon number of 7 or less because the effect of accelerating the reaction increases.

A content of the alkali metal compound (B) is preferably in a ratio from 0.1 to 10 mol % in terms of alkali metal elements based on the functional group derived from the unsaturated carboxylic acid or the derivative thereof in the modified olefin-based polymer (a-1). The above ratio is more preferably from 1 to 8 mol %, and even more preferably from 2 to 7 mol %. When the ratio is more than 10 mol %, the color is prone to become worse. In contrast, when it is less than 0.1 mol %, the effect of accelerating the reaction of the modified olefin-based polymer (a-1) and the polymer (a-2) is prone to decrease.

[Other Components]

The compatibilizer of the present invention may also contain an unmodified olefin-based polymer as long as not inhibiting the effects of the present invention. This enables to reduce production costs of the compatibilizer. Particularly in a case of using the compatibilizer as a recycling agent, the effect of cost reduction increases. The unmodified olefin-based polymer may include, for example, a homopolymer or a copolymer of olefin, such as linear low density polyethylene (LLDPE), low density polyethylene (LDPE), very low density polyethylene (VLDPE), medium density polyethylene (MDPE), high density polyethylene (HDPE), an ethylene-propylene (block or random) copolymer, polypropylene (PP), a copolymer of propylene and α-olefin having a carbon number from 4 to 20, polybutene, polypentene, and polymethylpentene; or a copolymer of olefin and vinyl ester, such as vinyl acetate, an ionomer, acrylic acid or methacrylic acid, or acrylic acid ester or methacrylic acid ester. These unmodified olefin-based polymers can be used in one type singly or in combination of two types or more.

Among the above unmodified olefin-based polymers, aliphatic hydrocarbon-based polymers, such as linear low density polyethylene (LLDPE), low density polyethylene (LDPE), very low density polyethylene (VLDPE), high density polyethylene (HDPE), an ethylene-propylene (block or random) copolymer, and polypropylene (PP), and an ethylene-vinyl acetate (EVA) copolymer are preferred due to the good compatibility to the polymer (A). The unmodified olefin-based polymer is blended preferably 95 mass % or less based on the entire compatibilizer, and more preferably 90 mass % or less. From the perspective of production cost reduction of the compatibilizer, the unmodified olefin-based polymer is blended preferably 10 mass % or more and more preferably 20 mass % or more.

In a case of diluting the polymer (A) with the unmodified olefin-based polymer, melt kneading may be carried out after dry blending the unmodified olefin-based polymer in the polymer (A), and melt kneading may also be carried out after dry blending the modified olefin-based polymer (a-1) and the unmodified olefin-based polymer in advance and then adding the polymer (a-2) to dry blend again.

The compatibilizer of the present invention may also contain a higher fatty acid metal salt, further. The higher fatty acid metal salt is a metal salt of higher fatty acid having a carbon number from 8 to 22, and may include, for example, an alkali metal salt, such as sodium and potassium, an alkaline earth metal salt, such as magnesium, calcium, and barium, a zinc metal salt, a manganese metal salt, and the like of organic acid, such as stearic acid, isostearic acid, oleic acid, linoleic acid, linolenic acid, lauric acid, undecylenic acid, palmitic acid, arachidonic acid, behenic acid, and myristic acid. Among these, an alkali metal salt or an alkaline earth metal salt of stearic acid is preferred. These higher fatty acid metal salts can be used in one type singly or in combination of two types or more. The blended amount of higher fatty acid metal salt is preferably 20 mass % or less based on the entire compatibilizer and more preferably 10 mass % or less.

The compatibilizer of the present invention may also contain a hydrotalcite compound, further. The hydrotalcite compound is, as long as it is a double hydroxide, not particularly limited and may be a combination of any composition of $Mg^{2+}$, $Fe^{2+}$, $Zn^{2+}$, $Ca^{2+}$, $Li^{2+}$, $Ni^{2+}$, $Co^{2+}$, $Cu^{2+}$, $Al^{3+}$, $Fe^{3+}$, and $Mn^{3+}$. The hydrotalcite compound is preferably blended 20 mass % or less based on the entire compatibilizer and more preferably 10 mass % or less.

Further, the compatibilizer of the present invention can also be blended appropriately with an additive, such as a plasticizer, a lubricant, a thermal stabilizer, a light stabilizer, an ultraviolet absorber, an antioxidant, a colorant, an antistatic, a surfactant, an antimicrobial, a desiccant, an oxygen absorber, and an antiblocking agent, as long as not inhibiting the effects of the present invention.

[Method of Producing Compatibilizer]

The compatibilizer is preferably obtained by melt kneading the modified olefin-based polymer (a-1) and the polymer (a-2) to react both of them.

It is preferred that a blending ratio of the modified olefin-based polymer (a-1) and the polymer (a-2) is from 0.1 to 200 parts by mass of the polymer (a-2) based on 100 parts by mass of the modified olefin-based polymer (a-1). The polymer (a-2) is more preferably blended from 1 to 100 parts by mass, even more preferably from 2 to 50 parts by mass, and most preferably from 5 to 20 parts by mass.

In the compatibilizer, there may also be the unreacted modified olefin-based polymer (a-1) and the unreacted polymer (a-2), and in that case, the polymer (A) may also be generated by reacting the modified olefin-based polymer (a-1) and the polymer (a-2) when melt processing a resin mixed with a recovery.

In a case where the compatibilizer contains another polymer or additive other than the unreacted modified olefin-based polymer (a-1), the unreacted polymer (a-2), the polymer (A), and the alkali metal compound (B), such another polymer or additive may be added before melt kneading and may also be added after melt kneading.

A method of mixing the polymer (A) and another component is not particularly limited as long as they are uniformly mixed, and it may be dry blending to mix still in a solid state or may also be melt blending to mix by melt kneading. A manner of melt blending may include a method of using, for example, a ribbon blender, a mixer cokneader, a pelletizer, a mixing roll, an extruder, and an intensive mixer.

A preferred method of producing the compatibilizer of the present invention may include a method of using an extruder from the perspective of convenience, an economic efficiency, and quality. In particular, as the extruder, a method of using a twin screw extruder is more preferred in view of efficiently enabling the reaction of the modified olefin-based polymer (a-1) and the polymer (a-2) and in view of enabling effective mixing of the polymer (A) and another component.

In a case where the compatibilizer contains another component other than the polymer (A), an order of producing the polymer (A) and mixing of another component is not particularly limited, and another component may be mixed after producing the polymer (A) and may also be mixed at the same time of producing the polymer (A). For example, in a case of the latter, by mixing the modified olefin-based polymer (a-1) and another component, such as the unmodified olefin-based polymer and then adding the polymer (a-2) when melt extruding to react it with the modified olefin-based polymer (a-1), the polymer (A) can be produced, and at the same time, each component can also be mixed. Alternatively, by mixing in advance the modified olefin-based polymer (a-1), the polymer (a-2), and another component, such as the unmodified olefin-based polymer and then melt extruding to react the modified olefin-based polymer (a-1) and the polymer (a-2), the polymer (A) can be produced, and at the same time, each component can also be mixed. In this case, compared with a case of melt extruding, after producing the polymer (A), to mix with another component, the number of times of melt extrusion can be reduced and thus the costs can be reduced. In addition, by decreasing the thermal history in the molten state, the quality of the recycling agent thus obtained becomes good.

In the method of producing a compatibilizer, a preferred extrusion temperature in a case of using a twin screw extruder is from 180° C. to 250° C. When the extrusion temperature is below 180° C., the reaction of the modified olefin-based polymer (a-1) and the polymer (a-2) does not proceed sufficiently, and thus the polymer (A) is not easily obtained. In contrast, in a case of more than 250° C., there is a possibility of thermally degrading the modified olefin-based polymer (a-1), the polymer (a-2), and other components, and thus there is a risk of worsening the color, such as yellowing, of the compatibilizer thus obtained and also generating gels and particles. From the perspective of the performance and the quality of the compatibilizer thus obtained, the extrusion temperature range is more preferably from 190° C. to 240° C. and even more preferably from 200° C. to 230° C.

It is preferred that the compatibilizer of the present invention does not substantially contain the unreacted polymer (a-2). That is, it is preferred that the substantially total amount of the polymer (a-2) is consumed by the reaction with the modified olefin-based polymer (a-1). When the unreacted polymer (a-2) remains in the compatibilizer, it is not preferred because the reaction of the EVOH and the functional group derived from the carboxylic acid or the derivative thereof is inhibited. That the polymer (a-2) is not substantially contained in the compatibilizer, herein, can be confirmed by finding no peak in the heat of fusion of the unreacted polymer (a-2) when the compatibilizer is analyzed with a differential scanning calorimeter (hereinafter, may be referred to as DSC).

[Recycling Agent]

A recycling agent comprising the above compatibilizer is a preferred embodiment of the present invention. The recycling agent made with the compatibilizer excellent in the effect of improving the compatibility between the EVOH and the thermoplastic resin exhibits an excellent effect as a recycling agent of a multilayer structure including an EVOH layer and a thermoplastic resin layer.

[Mixed Resin]

A mixed resin of the present invention is obtained by blending the recycling agent in a recovery of a multilayer structure including an EVOH layer and a thermoplastic resin layer.

The EVOH of the EVOH layer in the multilayer structure to be recycled can be produced in a known method of copolymerizing ethylene and vinyl ester using a radical initiator and subsequently saponifying in the presence of an alkali catalyst. The vinyl ester may include, for example, vinyl acetate, vinyl propionate, vinyl pivalate, vinyl caprate, vinyl benzoate, and the like. The above vinyl ester can be used in one type singly or in combination of two types or more. Among these, vinyl acetate is preferred.

When copolymerizing ethylene and vinyl ester, another copolymer component may also coexist for copolymerization. Such another copolymer component may include, for example: an olefin-based monomer, such as propylene, 1-butene, and isobutene; an acrylamide-based monomer, such as acrylamide, N-methylacrylamide, N-ethylacrylamide, and N,N-dimethylacrylamide; a methacrylamide-based monomer, such as methacrylamide, N-methylmethacrylamide, N-ethylmethacrylamide, and N,N-dimethylmethacrylamide; a vinyl ether-based monomer, such as methyl vinyl ether, ethyl vinyl ether, n-propyl vinyl ether, i-propyl vinyl ether, t-butyl vinyl ether, and dodecyl vinyl ether; allyl alcohol; vinyltrimethoxysilane; N-vinyl-2-pyrrolidone; and the like.

Although a content of ethylene in the EVOH used for the EVOH layer is not particularly limited, it is preferably from to 60 mold. In a case of the ethylene content of less than 5 mol %, there is a risk of insufficient melt stability. A lower limit of the ethylene content is more preferably 15 mol % and even more preferably 20 mol %. In contrast, when the ethylene content is more than 60 mol %, there is a risk of an insufficient barrier property of the multilayer structure thus obtained. An upper limit of the ethylene content is more preferably 55 mol % and even more preferably 50 mol %. The EVOH normally has a degree of saponification from 80 to 100 mol %, preferably from 90 to 100 mol %, more preferably from 95 to 100 mol %, even more preferably from 98 to 100 mol %, and particularly preferably from 99 to 100 mol %. When the degree of saponification is low, there is a risk of an insufficient barrier property of the multilayer structure thus obtained or insufficient thermal stability at the time of melt processing.

For the purpose of improvement of the retort resistant property, polyamide may also be blended in the EVOH used for the EVOH layer. The type of polyamide is not particularly limited and it is exemplified by 6-nylon, 6,6-nylon, 6,10-nylon, 11-nylon, 12-nylon, and further copolymer nylon containing two or more types of components constituting any of the above nylons. The polyamide is preferably blended 50 parts by mass or less based on 100 parts by mass of the EVOH and more preferably 30 parts by mass or less. The EVOH used for the EVOH layer may also contain, as long as not inhibiting the effects of the present invention, a boron compound, a phosphate compound, a fatty acid salt, and the like.

Although the melt flow rate (MFR) (190° C., under the load of 2160 g) of the EVOH used for the EVOH layer is not particularly limited, it is preferably from 0.1 to 16 g/10 min. For a polymer having a melting point around 190° C. or more than 190° C., a MFR is defined as a value obtained by measuring at a plurality of temperatures of the melting point or higher under the load of 2160 g and plotting the results with reciprocals of absolute temperatures as abscissa against logarithms of MFRs as ordinate in a semi-logarithmic graph for extrapolation to 190° C.

The thermoplastic resin constituting the thermoplastic resin layer of the multilayer structure to be recycled may include an olefin-based polymer. As the olefin-based polymer, the polymers listed as the unmodified olefin-based polymer can be used, and among them, aliphatic hydrocarbon-based polymers, such as linear low density polyethylene (LLDPE), low density polyethylene (LDPE), very low density polyethylene (VLDPE), high density polyethylene (HDPE), an ethylene-propylene (block or random) copolymer, and polypropylene (PP), and an ethylene-vinyl acetate (EVA) copolymer are preferred due to the good compatibility to the polymer (A) and easy demonstration of the effects of the present invention.

Although the MFR (190° C., under the load of 2160 g) of the olefin-based polymer used for the thermoplastic resin layer is not particularly limited as long as there is no processing problem, it is normally from 0.1 to 50 g/10 min and preferably from 0.5 to 30 g/10 min.

As the thermoplastic resin constituting the thermoplastic resin layer of the multilayer structure to be recycled, it is also possible to use a halogen containing resin, such as a polyvinyl chloride-based resin, polyvinylidene chloride, chlorinated polyethylene, and chlorinated polypropylene; a polyester-based resin, such as polyethylene terephthalate and polybutylene terephthalate; a polyamide-based resin, such as nylon 6 and nylon 12; an acrylic resin; a polystyrene-based resin; a vinyl ester-based resin; a polyester-based elastomer; a polyurethane-based elastomer; aromatic and aliphatic polyketone; and the like.

As the thermoplastic resin constituting the thermoplastic resin layer of the multilayer structure to be recycled, it is also possible to use a composition containing a recovery of the multilayer structure. This enables to repeatedly utilize the recovery of the multilayer structure.

The multilayer structure to be recycled may also contain an adhesive resin layer. An adhesive resin constituting the adhesive resin layer is appropriately selected depending on the type of the thermoplastic resin and may include, for example, an olefin-based polymer having unsaturated carboxylic acid or a derivative thereof introduced therein by a chemical bond, and may specifically include maleic anhydride graft-modified polyolefin, such as maleic anhydride graft-modified polyethylene and maleic anhydride graft-modified polypropylene; and a maleic anhydride graft-modified product of a copolymer of olefin and a vinyl-based monomer, such as a maleic anhydride graft-modified ethylene-propylene (block or random) copolymer, a maleic anhydride graft-modified ethylene-ethyl acrylate copolymer, and a maleic anhydride graft-modified ethylene-vinyl acetate copolymer. These olefin-based polymers can be used in one type singly or in combination of two types or more.

In a case where the adhesive resin layer is included in the multilayer structure to be recycled, the EVOH reacts with the adhesive resin to be prone to gelate when the recovery of the multilayer structure is reused for melt processing. Accordingly, in such a case, the effects of the recycling agent of the present invention are demonstrated more effectively.

The multilayer structure to be recycled is not particularly limited, as long as it includes the EVOH layer and the thermoplastic resin layer, in the layer constitution, the total number of layers, the thickness and the ratio of layers, the types of the EVOH and the thermoplastic resin, the presence of the adhesive resin and the type, and the like. As the recovery of the multilayer structure, it is possible to use wastes, chips, or defective products from molding the multilayer structure, trash after using various molded articles, or the like.

In order to serve the recovery of the multilayer structure again for melt processing with an extruder or the like, it is preferred to grind the recovery. A known grinder can be used for grinding. Although the shape and the particle size of the ground product are not particularly limited, it is preferred to have an apparent density from 0.25 to 0.85 g/ml, more preferably from 0.3 to 0.7 g/ml, and even more preferably from 0.35 to 0.6 g/ml. In a case of the apparent density of less than 0.25 g/ml, the dispersion of the EVOH in the mixed resin becomes defective and thus the melt processability and the mechanical properties of a molded article thus obtained are prone to decrease. In contrast, when it is more than 0.85 g/ml, the melt processability is prone to decrease due to occurrence of a supply failure of the mixed resin in the extruder. The apparent density herein means a value measured in a testing method of "5.3 Apparent Density" of JIS-K6891. The apparent density can be adjusted by the shape of a grinding blade of the grinder, the rotation speed of the grinding blade, the processing speed of grinding, the opening size of a mesh to be used, and the like.

Although a content of the EVOH in the multilayer structure to be recycled varies depending on the constitution of the multilayer structure, it is normally from 0.1 to 30 mass % based on a total weight of the recovery. Although the EVOH content is not particularly limited in the mixed resin of the present invention, a smaller EVOH content can better inhibit the generation of fish eyes and the adhesion of a degraded resin to a screw, so that the EVOH content may also be adjusted by blending the olefin-based polymer therein.

By blending the recycling agent in the recovery of the multilayer structure thus obtained, the mixed resin is obtained. It is preferred that the recycling agent is contained from 0.5 to 10 mass % in the mixed resin, more preferably from 0.8 to 9 mass %, and even more preferably from 1 to 7 mass %. When the content is less than 0.5 mass %, the effect of blending the recycling agent is prone to be insufficient. In contrast, when it is more than 10 mass %, the transparency of the multilayer structure thus obtained is prone to becomes worse.

A method of blending the recycling agent in the recovery can use a known mixer, such as a rocking mixer, a ribbon blender, a super mixer, and a line mixer. A molded article can be obtained by directly supplying the mixed resin thus obtained to a molding machine and a molded article can also be obtained by, after repelletization by melt kneading normally at a temperature from 150° C. to 300° C. using an extruder in advance, supplying such pellets to a molding machine. It is preferred to supply the mixed resin directly to a molding machine without repelletization due to the excellence in the processability and the color of a molded article and also the advantages in the productivity and the economic efficiency. It is also possible to supply the mixed resin to a molding machine after further mixing an appropriate amount of an olefin-based polymer therewith.

[Multilayer Structure]

The multilayer structure molded by using the mixed resin recycled by using the recycling agent of the present invention is a multilayer structure including at least one layer obtained by melt processing the mixed resin. The multilayer structure can be molded into any molded article, such as a film, a sheet, a tape, a cup, a tray, a tube, a bottle, and a pipe.

As a method of producing the multilayer structure, a known method, such as coextrusion molding, coinjection molding, and extrusion coating, can be employed. From the perspective of versatility, coextrusion molding and coinjection molding are useful. In a case of coextrusion molding or coinjection molding, the respective materials, such as the mixed resin, the EVOH, the thermoplastic resin, and the adhesive resin, can be supplied to a molding machine. The multilayer structure may also be secondary processed according to the intended shape. The secondary processing may include a method, such as stretching, thermoforming, and blow molding. The stretching method may include roll stretching, tenter stretching, tubular drawing, stretch blowing, and the like. In a case of biaxially stretching, either system of a simultaneous biaxial stretching system or a sequential biaxial stretching system can be employed. The thermoforming may include a method of molding the multilayer structure in a film or sheet shape into a cup or tray shape by vacuum forming, pressure forming, vacuum pressure forming, and the like. The blow molding may include a method of molding the multilayer structure in a parison shape into a bottle or tube shape by blowing.

The multilayer structure of the present invention is not particularly limited, as long as it includes at least one layer obtained by melt processing the mixed resin, in the layer constitution, the total number of layers, the thickness and the ratio of layers, the types of the resins used for other layers, the presence of the adhesive resin and the type, and the like. It is preferred that the multilayer structure includes an EVOH layer in addition to the layer obtained by melt processing the mixed resin because of the excellent gas barrier property. A layer structure of the multilayer structure may include the following structures, for example. A layer obtained by melt processing the mixed resin (recycled resin layer) is expressed as Reg., an EVOH layer as EVOH, an olefin-based polymer layer as PO, and an adhesive resin layer as AD.

Reg./EVOH
Reg./AD/EVOH
Reg./AD/EVOH/AD/EVOH
Reg./AD/EVOH/AD/PO
Reg./AD/EVOH/AD/Reg./PO
PO/Reg./AD/EVOH
PO/Reg./AD/EVOH/AD/PO
PO/Reg./AD/EVOH/AD/Reg./PO
PO/AD/EVOH/Reg./EVOH/AD/PO

The multilayer structure of the present invention can be packed with contents therein according to the purpose for transportation and storage. As the contents, both foods and non-foods can be used, and they may also be any of a dry matter, a water containing matter, and an oil containing matter. The multilayer structure can also be served for boiling treatment and retort treatment, and in that case, the structures having polypropylene used in both outer layers or having a thick EVOH layer are used preferably.

Application examples of the multilayer structure of the present invention may include a bottle for mayonnaise, ketchup, vegetable oil, milk beverage, fruits preserved in syrup, grilled meat sauce, and the like; a tray or a cup for cocked rice for microwave ovens, curry sauce blocks, fruit jelly, coffee beverage, yogurt, soybean paste, and the like; a tube for cosmetics, spice paste, tooth paste, and the like; and a film for dried bonito flakes, instant soybean paste, ramen soup, sliced rice cake, sweet red bean jelly, bean sprouts, coffee, ketchup for business use, and the like.

EXAMPLES

The present invention is described more specifically below by way of Examples while it is not limited to these Examples. Various measurements were obtained in the following methods.

1) Amount of Modification of Modified Olefin-Based Polymer (a-1)

An acid value of the polymer was measured in accordance with JIS K2501 to calculate the amount of modification (graft ratio) of the modified olefin-based polymer (a-1) from the acid value.

2) Molecular Weight of Polymer (a-2) Containing Terminal Functional Group

A hydroxyl number of the polymer was measured in accordance with JIS K1557-1 and a ratio of those at an end of the polymer out of the material monomers was calculated from the hydroxyl number to obtain the molecular weight of the polymer (a-2) containing a terminal functional group. It should be noted that, for trimethylolpropane (a-2)', the molecular weight was calculated from the structural formula.

3) Presence of Unreacted Polymer (a-2) Containing Terminal Functional Group in Recycling Agent Recycling agents obtained in Examples and Comparative Examples were analyzed with a differential scanning calorimeter (DSC) ("SSC/5200" manufactured by Seiko Instruments Inc.) to confirm the presence of the unreacted polymer (a-2) from the presence of a peak of heat of fusion of the polymer (a-2) containing a terminal functional group. That is, a peak of heat of fusion is observed with the DSC in a case where the unreacted polymer (a-2) remains in the recycling agent, while a peak of heat of fusion is not observed in a case where it does not remain.

4) Amount of Reaction of Terminal Functional Group in Polymer (a-2) Based on Amount of Functional Groups Derived from Unsaturated Carboxylic Acid or Derivative Thereof in Modified Olefin-Based Polymer (a-1)

Acid values of recycling agents obtained in Examples and Comparative Examples were measured, and an amount of functional groups derived from the unreacted unsaturated carboxylic acid in the polymer (A) in the recycling agent was calculated from the values of acid values thus obtained to obtain the amount from a difference between the calculated value and a value obtained by multiplying the amount of functional groups derived from the unsaturated carboxylic acid in the used modified olefin-based polymer (a-1) by a blending ratio contained in the recycling agent. An acid value of a sample was calculated using the following expression from a drip obtained by, after dissolving 1 g of a sample and 1 mg of phenolphthalein in 200 ml of xylene in a 500 ml Erlenmeyer flask, titration with 0.05 mol/L of a solution of potassium hydroxide in ethanol using a burette.

$$\text{Acid Value (mg/g)} = 0.05 \times 56 \times V$$

V: Drip (L) of Solution of Potassium Hydroxide in Ethanol

5) Screw Adhesion Amount

After an operation of melt kneading 20 kg of mixed resins obtained in Examples and Comparative Examples below and then melt kneading the pellets thus obtained again was repeated to melt knead five times in total, it was driven for 15 minutes with low density polyethylene, followed by removing a screw to collect a screw adhesion for weighing. The screw adhesion amount is preferably 300 mg or less and more preferably 150 mg or less. The following shows the used extruder and the melt kneading conditions.

Extruder: Twin-Screw Extruder "Labo Plastomill" manufactured by Toyo Seiki Seisaku-sho, Ltd.
    Screw Diameter: 25 mmϕ
    Screw Rotation Speed: 100 rpm
    Feeder Rotation Speed: 100 rpm
    Cylinder and Die Temperature Settings: C1/C2/C3/C4/C5/D=180° C./210° C./230° C./230° C./230° C./230° C.

6) Die Build-Up Generation Amount

In the above 5), at the first melt kneading, die build-up adhered to the die lip of the extruder were collected for weighing to define it as a die build-up generation amount. The die build-up generation amount is preferably 100 mg or less and more preferably 40 mg or less.

7) Fish Eye

Using mixed resins obtained in Examples and Comparative Examples below as the recycled resins, EVOH-1 below as the EVOH, AD-1 below as the adhesive resin, three-type five-layer coextrusion of recycled resin layer/adhesive resin layer/EVOH layer/adhesive resin layer/recycled resin layer=50 μm/10 μm/10 μm/10 μm/50 μm was carried out with a feedblock die to prepare a sheet of a multilayer structure including the recycled resin layer. The following shows the used extruders and the melt kneading conditions.

Extruder 1 [Recycled Resin Layer]:
    Device: Single-Screw Extruder "GT-32-A Type" manufactured by Research Laboratory of Plastics Technology Co., Ltd.
    Screw Diameter: 32 mmϕ
    Screw Rotation Speed: 70 rpm
    Cylinder Setup temperature: 220° C.

Extruder 2 [Adhesive Resin Layer]:
    Device: Single-Screw Extruder "P25-18AC" manufactured by Osaka Seiki Kosaku Kabushiiki Kaisha
    Screw Diameter: 25 mmϕ
    Screw Constitution Fullflight
    L/D: 18
    Screw Rotation Speed: 70 rpm
    Cylinder Setup Temperature: 220° C.

Extruder 3 [EVOH Layer]:
    Device: Single-Screw Extruder "Labo ME-type CO-NXT" manufactured by Toyo Seiki Seisaku-sho, Ltd.
    Screw Diameter: 20 mmϕ
    Screw Rotation Speed: 40 rpm
    Cylinder Setup Temperature: 220° C.
    Die Size: 300 mm
    Sheet Taking-Off Rate: 1 m/min
    Temperature of Cooling Roll: 60° C.

The sheet thus obtained is cut out into 10 cm×10 cm to visually count a number of fish eyes having a diameter of 0.3 mm or more in the cut out sheet. The number of fish eyes is preferably less than 20 and more preferably 5 or less.

8) Transparency

Using the sheet obtained in 7), haze was measured by a reflecto-transmitance meter ("HR-100 Type" manufactured by Murakami Color Research Laboratory Co., Ltd.) in accordance with JIS K7105 to define it as an index for the transparency. The haze is preferably less than 23.0 and more preferably 20.0 or less.

In Production Example, Examples, and Comparative Examples below, the following polymers, resins, and compounds were used.

[Ethylene-Vinyl Alcohol Copolymer]

EVOH-1: EVOH (Ethylene Content 32 mol %, Degree of Saponification 99.7 mol %, Limiting Viscosity 1.1 dL/g at 30° C. in water-containing Phenol, MFR (190° C., Load 2160 g)=1.6 g/10 min), SP Value=12.30 $(cal/cm^3)^{1/2}$

[Thermoplastic Resin]

PP-1: Polypropylene ("NOVATEC PP EA7A" (Trade Name) produced by Japan Polypropylene Corporation, MFR (230° C., Load 2160 g)=1.4 g/10 min)

[Adhesive Resin]

AD-1: Maleic Anhydride Modified Polypropylene ("MODIC AP P604V" (trade name) produced by Mitsubishi Chemical Corporation, MFR (230° C., Load 2160 g)=3.2 g/10 min)

[Modified Olefin-Based Polymer]

(a-1)-1: Maleic Anhydride Graft-Modified Polypropylene (MFR (230° C., Load 2160 g)=23 g/10 min, Amount of Modification=0.4 mass %)

(a-1)-2: Maleic Anhydride Graft-Modified Polyethylene (MFR (230° C., Load 2160 g)=18 g/10 min, Amount of Modification=0.4 mass %)

(a-1)-3: Maleic Anhydride Graft-Modified SEBS (MFR (230° C., Load 2160 g)=2.2 g/10 min, Amount of Modification=0.4 mass %) (SEBS: Partially Hydrogenated Product of Styrene-Butadiene-Styrene Triblock Copolymer, Styrene Ratio=20 mass %, Hydrogenation Rate=94 mol %)

(a-1)-4: Maleic Anhydride Graft-Modified Ethylene-Butene Copolymer (MFR (230° C., Load 2160 g)=0.4 g/10 min, Amount of Modification=0.4 mass %)

(a-1)-5: Maleic Anhydride Graft-Modified Polypropylene (MFR (230° C., Load 2160 g)=52 g/10 min, Amount of Modification=0.8 mass %)

(a-1)': Maleic Anhydride Graft-Modified Polypropylene (MFR (230° C., Load 2160 g)=100 g/10 min, Amount of Modification=2.2 mass %)

[Unmodified Olefin-Based Polymer]
LDPE-1: Low Density Polyethylene ("Sumikathene F200" (trade name) produced by Sumitomo Chemical Co., Ltd., MFR (190° C., 2160 g of Load)=2.0 g/10 min, Density=0.924 g/cm$^3$)
[Polymer Containing Terminal Functional Group]
(a-2)-1: Polyethylene Glycol Monomethyl Ether (Mn=4000), SP Value=11.91 (cal/cm$^3$)$^{1/2}$
(a-2)-2: Polyethylene Glycol Monomethyl Ether (Mn=2000), SP Value=11.89 (cal/cm$^3$)$^{1/2}$
(a-2)-3: Polypropylene Glycol Monomethyl Ether (Mn=4000), SP Value=11.22 (cal/cm$^3$)$^{1/2}$
(a-2)-4: Polyethylene Glycol (Mn=4000), SP Value=11.93 (cal/cm$^3$)$^{1/2}$
(a-2)-5: Polyethylene Glycol ("PEG-6000P" (trade name) produced by Sanyo Chemical Industries, Ltd., Mn=8300), SP Value=11.93 (cal/cm$^3$)$^{1/2}$
(a-2)-6: Polyethylene Glycol ("PEG-4000P" (trade name) produced by Sanyo Chemical Industries, Ltd., Mn=3300), SP Value=11.93 (cal/cm$^3$)$^{1/2}$
(a-2)-7: Polypropylene Glycol ("PP-4000" (trade name) produced by Sanyo Chemical Industries, Ltd., Mn=4000), SP Value=11.24 (cal/cm$^3$)$^{1/2}$
(a-2)': Trimethylolpropane (Mn=134), SP Value=15.37 (cal/cm$^3$)$^{1/2}$
[Alkali Metal Compound]
(B)-1: Potassium Acetate
(B)-2: Sodium Stearate Production Example 1

Production of Recovery of Multilayer Structure

Respectively using EVOH-1 as the EVOH, PP-1 as the thermoplastic resin, AD-1 as the adhesive resin, three-type five-layer coextrusion of thermoplastic resin layer/adhesive resin layer/EVOH layer/adhesive resin layer/thermoplastic resin layer=200 μm/40 μm/40 μm/40 μm/200 μm was carried out with a feedblock die to prepare a multilayer structure including the EVOH layer and the thermoplastic resin layers. The following shows the used extruders and the melt kneading conditions.
Extruder 1 [Thermoplastic Resin Layer]:
  Device: Single-Screw Extruder "GT-32-A Type" manufactured by Research Laboratory of Plastics Technology Co., Ltd.
  Screw Diameter: 32 mmφ
  Screw Rotation Speed: 70 rpm
  Cylinder Setup temperature: 220° C.
Extruder 2 [Adhesive Resin Layer]:
  Device: Single-Screw Extruder "P25-18AC" manufactured by Osaka Seiki Kosaku Kabushiiki Kaisha
  Screw Diameter: 25 mmφ
  Screw Constitution: Fullflight
  L/D: 18
  Screw Rotation Speed: 70 rpm
  Cylinder Setup Temperature: 220° C.
Extruder 3 [EVOH Layer]:
  Device: Single-Screw Extruder "Labo ME-type CO-NXT" manufactured by Toyo Seiki Seisaku-sho, Ltd.
  Screw Diameter: 20 mmφ
  Screw Rotation Speed: 40 rpm
  Cylinder Setup Temperature: 220° C.
  Die Size: 300 mm
  Sheet Taking-Off Rate: 1 m/min
  Temperature of Cooling Roll: 60° C.

The multilayer structure thus obtained was ground by a grinder having a mesh of a diameter of 8 mmφ to obtain a recovery of the multilayer structure. An apparent density of the recovery thus obtained was 0.40 g/ml and an EVOH content was 8.0 mass % based on the total weight of the recovery.

Example 1

The modified olefin-based polymer (a-1)-1 and the unmodified olefin-based polymer LDPE-1 were dry blended in a ratio of [(a-1)-1]/[LDPE-1]=25/75 (mass ratio), and subsequently, the polymer (a-2)-1 containing a terminal functional group was added in a ratio of 10 mol % of hydroxyl groups in (a-2)-1 based on the acid anhydride groups in (a-1)-1. A product of dry blending it again was melt kneaded with an extruder to obtain a recycling agent in a pellet shape. The following shows the used extruder and the melt kneading conditions.
Extruder: Twin-Screw Extruder "Labo Plastomill" manufactured by Toyo Seiki Seisaku-sho, Ltd.
  Screw Diameter: 25 mmφ
  Screw Rotation Speed: 100 rpm, Feeder Rotation Speed: 100 rpm
  Cylinder and Die Temperature Settings: C1/C2/C3/C4/C5/D=180° C./210° C./220° C./220° C./220° C./220° C.

Using the recycling agent thus obtained, various evaluations were made in the methods described in 3) and 4). The results are shown in Table 1.

The recycling agent thus obtained was dry blended in a ratio of recovery/recycling agent=97.5/2.5 (mass ratio) based on the recovery obtained in Production Example 1 to obtain a mixed resin. Using the mixed resin thus obtained, various evaluations were made in the methods described in 5) through 8). The results are shown in Table 1.

Example 2

A recycling agent was produced in a same manner as Example 1 and various evaluations were made in a same manner as Example 1 other than modifying the amount of blended recycling agent in the recovery to the amount shown in Table 1. The results are shown in Table 1.

Comparative Example 1

Using only the recovery obtained in Production Example 1 as the mixed resin not blending the recycling agent, various evaluations were made in the methods described in 5) through 8). The results are shown in Table 1.

Comparative Example 2

Using a mixed resin obtained by dry blending in a ratio of [recovery obtained in Production Example 1]/[modified olefin-based polymer (a-1)-1]=97.5/2.5 (mass ratio), various evaluations were made in the methods described in 5) through 8). The results are shown in Table 1.

Comparative Example 3

Using a mixed resin obtained by dry blending in a ratio of [recovery obtained in Production Example 1]/[polymer (a-2)-1 containing a terminal functional group]=99.7/0.3 (mass ratio), various evaluations were made in the methods described in 5) through 8). The results are shown in Table 1.

TABLE 1

|  | Example 1 | Example 2 | Comparative Example 1 | Comparative Example 2 | Comparative Example 3 |
|---|---|---|---|---|---|
| Recycling Agent |  |  |  |  |  |
| Modified Olefin-Based Polymer (a-1) | (a-1)-1 | (a-1)-1 | — | (a-1)-1 | — |
| Terminal Functional Group Containing Polymer (a-2) | (a-2)-1 | (a-2)-1 | — | — | (a-2)-1 |
| Amount of Added Polymer (a-2) (mol %) | 10 | 10 | — | — | — |
| Presence of Unreacted Terminal Functional Group Containing Polymer (a-2) Polymer in Recycling Agent | Not Found | Not Found | — | — | — |
| Amount of Reaction of Terminal Functional Groups Based on Amount of Unsaturated Carboxylic Acid Groups (mol %) | 10 | 10 | — | — | — |
| Amount of Blended Recycling Agent in Recovery (mass %) | 2.5 | 7.5 | — | — | — |
| Evaluation Results |  |  |  |  |  |
| Screw Adhesion Amount (mg) | 97 | 110 | 357 | 181 | 261 |
| Die build-up Generation Amount (mg) | 16 | 13 | 172 | 61 | 118 |
| Fish Eyes (number) | 1 | 1 | 28 | 11 | 45 |
| Transparency (Haze) | 19.3 | 21.1 | 23.3 | 21.8 | 29.2 |

From Table 1, it is understood that the recycling agent of the present invention gives sufficient improvement effects to any of the adhesion of a degraded resin to a screw of a molding machine, the generation of die build-up, the generation of fish eyes, and the decrease in transparency upon melt processing the recovery of the multilayer structure including an EVOH layer and a thermoplastic resin layer. In contrast, Comparative Examples 1 through 3 not containing the recycling agent of the present invention did not have sufficient improvement effects in the adhesion of a degraded resin to a screw of a molding machine, the generation of die build-up, the generation of fish eyes, and the decrease in transparency.

Examples 3 Through 6 and Comparative Example 4

Other than modifying the type of the modified olefin-based polymer (a-1) used in Example 1 to the description in Table 2, a recycling agent was produced in a same manner as Example 1. Various evaluations were made in a same manner as Example 1 using the recycling agent thus obtained. The results are shown in Table 2. The results of Example 1 are also shown again for reference.

TABLE 2

|  | Example 1 | Example 3 | Example 4 | Example 5 | Example 6 | Comparative Example 4 |
|---|---|---|---|---|---|---|
| Recycling Agent |  |  |  |  |  |  |
| Modified Olefin-Based Polymer (a-1) | (a-1)-1 | (a-1)-2 | (a-1)-3 | (a-1)-4 | (a-1)-5 | (a-1)' |
| Terminal Functional Group Containing Polymer (a-2) | (a-2)-1 | (a-2)-1 | (a-2)-1 | (a-2)-1 | (a-2)-1 | (a-2)-1 |
| Amount of Added Polymer (a-2) (mol %) | 10 | 10 | 10 | 10 | 10 | 10 |
| Presence of Unreacted Terminal Functional Group Containing Polymer (a-2) Polymer in Recycling Agent | Not Found | Not Found | Not Found | Not Found | Not Found | Not Found |
| Amount of Reaction of Terminal Functional Groups Based on Amount of Unsaturated Carboxylic Acid Groups (mol %) | 10 | 10 | 10 | 10 | 10 | 10 |
| Amount of Blended Recycling Agent in Recovery (mass %) | 2.5 | 2.5 | 2.5 | 2.5 | 2.5 | 2.5 |
| Evaluation Results |  |  |  |  |  |  |
| Screw Adhesion Amount (mg) | 97 | 119 | 128 | 117 | 108 | 122 |
| Die build-up Generation Amount (mg) | 16 | 22 | 25 | 23 | 26 | 77 |
| Fish Eyes (number) | 1 | 2 | 4 | 3 | 3 | 67 |
| Transparency (Haze) | 19.3 | 21.7 | 22.3 | 22.8 | 21.9 | 30.4 |

From Table 2, it is understood that Comparative Example 4 using the modified olefin-based polymer (a-1)' having an amount of modification of more than 2 mass % as the modified olefin-based polymer (a-1) had poorer improvement effects in the generation of die build-up, the generation of fish eyes, and the decrease in transparency.

Examples 7 Through 9 and Comparative Example 5

Other than modifying the type of the polymer (a-2) containing a terminal functional group used in Example 1 to the description in Table 3, a recycling agent was produced in a same manner as Example 1. Various evaluations were made in a same manner as Example 1 using the recycling agent thus obtained. The results are shown in Table 3. The results of Example 1 are also shown again for reference.

TABLE 3

|  | Example 1 | Example 7 | Example 8 | Example 9 | Comparative Example 5 |
|---|---|---|---|---|---|
| Recycling Agent |  |  |  |  |  |
| Modified Olefin-Based Polymer (a-1) | (a-1)-1 | (a-1)-1 | (a-1)-1 | (a-1)-1 | (a-1)-1 |
| Terminal Functional Group Containing Polymer (a-2) | (a-2)-1 | (a-2)-2 | (a-2)-3 | (a-2)-4 | (a-2)' |
| Amount of Added Polymer (a-2) (mol %) | 10 | 10 | 10 | 10 | 10 |
| Presence of Unreacted Terminal Functional Group Containing Polymer (a-2) Polymer in Recycling Agent | Not Found | Not Found | Not Found | Not Found | Not Found |
| Amount of Reaction of Terminal Functional Groups Based on Amount of Unsaturated Carboxylic Acid Groups (mol %) | 10 | 10 | 10 | 10 | 10 |
| Amount of Blended Recycling Agent in Recovery (mass %) | 2.5 | 2.5 | 2.5 | 2.5 | 2.5 |
| Evaluation Results |  |  |  |  |  |
| Screw Adhesion Amount (mg) | 97 | 104 | 137 | 129 | 166 |
| Die build-up Generation Amount (mg) | 16 | 20 | 23 | 23 | 55 |
| Fish Eyes (number) | 1 | 2 | 4 | 6 | 10 |
| Transparency (Haze) | 19.3 | 21.5 | 21.1 | 19.8 | 27.6 |

From Table 3, it is understood that Comparative Example 5 using the trimethylolpropane (a-2)' having a molecular weight of less than 1,500 instead of the polymer (a-2) containing a terminal functional group had poorer improvement effects in the adhesion to a screw, the generation of die build-up, the generation of fish eyes, and the decrease in transparency.

Examples 10 and 11

Other than modifying the ratio of hydroxyl groups in the polymer (a-2)-1 containing a terminal functional group based on the acid anhydride groups in the modified olefin-based polymer (a-1)-1 in Example 1 to the description in Table 4, a recycling agent was produced in a same manner as Example 1. Various evaluations were made in a same manner as Example 1 using the recycling agent thus obtained. The results are shown in Table 4. The results of Example 1 are also shown again for reference.

TABLE 4

|  | Example 1 | Example 10 | Example 11 |
|---|---|---|---|
| Recycling Agent |  |  |  |
| Modified Olefin-Based Polymer (a-1) | (a-1)-1 | (a-1)-1 | (a-1)-1 |
| Terminal Functional Group Containing Polymer (a-2) | (a-2)-1 | (a-2)-1 | (a-2)-1 |
| Amount of Added Polymer (a-2) (mol %) | 10 | 5 | 50 |
| Presence of Unreacted Terminal Functional Group Containing Polymer (a-2) Polymer in Recycling Agent | Not Found | Not Found | Found |
| Amount of Reaction of Terminal Functional Groups Based on Amount of Unsaturated Carboxylic Acid Groups (mol %) | 10 | 5 | 37 |
| Amount of Blended Recycling Agent in Recovery (mass %) | 2.5 | 2.5 | 2.5 |
| Evaluation Results |  |  |  |
| Screw Adhesion Amount (mg) | 97 | 128 | 145 |
| Die build-up Generation Amount (mg) | 16 | 24 | 43 |

TABLE 4-continued

|  | Example 1 | Example 10 | Example 11 |
|---|---|---|---|
| Fish Eyes (number) | 1 | 6 | 9 |
| Transparency (Haze) | 19.3 | 19.2 | 22.5 |

Example 12

The modified olefin-based polymer (a-1)-1 and the unmodified olefin-based polymer LDPE-1 were dry blended in a ratio of [(a-1)-1]/[LOPE-1]=25/75 (mass ratio), and subsequently, the polymer (a-2)-5 containing a terminal functional group was added in a ratio of 10 mol % of hydroxyl groups in (a-2)-5 based on the acid anhydride groups in (a-1)-1 and the alkali metal compound (B)-1 was added in a ratio of 3 mol % based on the acid anhydride groups in (a-1)-1, respectively. A product of dry blending it again was melt kneaded with an extruder to obtain a recycling agent in a pellet shape. The following shows the used extruder and the melt kneading conditions.

Extruder: Twin-Screw Extruder "Labo Plastomill" manufactured by Toyo Seiki Seisaku-sho, Ltd.
 Screw Diameter: 25 mmφ
 Screw Rotation Speed: 100 rpm, Feeder Rotation Speed: 100 rpm
 Cylinder and Die Temperature Settings: C1/C2/C3/C4/C5/D=180° C./210° C./220° C./220° C./220° C./220° C.

Using the recycling agent thus obtained, various evaluations were made in the methods described in 3) and 4). The results are shown in Table 5.

The recycling agent thus obtained was dry blended in a ratio of recovery/recycling agent=97.5/2.5 (mass ratio) based on the recovery obtained in Production Example 1 to obtain a mixed resin. Using the mixed resin thus obtained, various evaluations were made in the methods described in 5) through 8). The results are shown in Table 5.

Example 13

A recycling agent was produced in a same manner as Example 12 and various evaluations were made in a same manner as Example 12 other than modifying the amount of blended recycling agent in the recovery to the amount shown in Table 5. The results are shown in Table 5.

Example 14

A recycling agent was produced in a same manner as Example 12 other than not adding the alkali metal compound (B). Using the recycling agent thus obtained, various evaluations were made in a same manner as Example 12. The results are shown in Table 5.

Comparative Example 6

Using only the recovery obtained in Production Example 1 as the mixed resin not blending the recycling agent, various evaluations were made in the methods described in 5) through 8). The results are shown in Table 5.

Comparative Example 7

Using a mixed resin obtained by dry blending in a ratio of [recovery obtained in Production Example 1]/[modified olefin-based polymer (a-1)-1]=97.5/2.5 (mass ratio), various evaluations were made in the methods described in 5) through 8). The results are shown in Table 5.

Comparative Example 8

Using a mixed resin obtained by dry blending in a ratio of [recovery obtained in Production Example 1]/[polymer (a-2)-5 containing a terminal functional group]=99.7/0.3 (mass ratio), various evaluations were made in the methods described in 5) through 8). The results are shown in Table 5.

TABLE 5

|  | Example 12 | Example 13 | Example 14 | Comparative Example 6 | Comparative Example 7 | Comparative Example 8 |
|---|---|---|---|---|---|---|
| Recycling Agent |  |  |  |  |  |  |
| Modified Olefin-Based Polymer (a-1) | (a-1)-1 | (a-1)-1 | (a-1)-1 | — | (a-1)-1 | — |
| Terminal Functional Group Containing Polymer (a-2) | (a-2)-5 | (a-2)-5 | (a-2)-5 | — | — | (a-2)-5 |
| Amount of Added Polymer (a-2) (mol %) | 10 | 10 | 10 | — | — | — |
| Alkali Metal Compound (B) | (B)-1 | (B)-1 | — | — | — | — |
| Amount of Added Alkali Metal Compound (B) (mol %) | 3 | 3 | — | — | — | — |
| Presence of Unreacted Terminal Functional Group Containing Polymer (a-2) Polymer in Recycling Agent | Not Found | Not Found | Found | Not Found | Not Found | Found |
| Amount of Reaction of Terminal Functional Groups Based on Amount of Unsaturated Carboxylic Acid Groups (mol %) | 10 | 10 | 7 | — | — | — |
| Amount of Blended Recycling Agent in Recovery (mass %) | 2.5 | 7.5 | 2.5 | — | 2.5 | 0.3 |
| Evaluation Results |  |  |  |  |  |  |
| Screw Adhesion Amount (mg) | 116 | 132 | 152 | 357 | 181 | 313 |
| Die build-up Generation Amount (mg) | 13 | 11 | 39 | 172 | 61 | 98 |
| Fish Eyes (number) | 2 | 3 | 12 | 28 | 11 | 52 |
| Transparency (Haze) | 17.5 | 18.8 | 20.1 | 23.3 | 21.8 | 24.3 |

From Table 5, it is understood that the recycling agent of the present invention gives sufficient improvement effects to any of the adhesion of a degraded resin to a screw of a molding machine, the generation of die build-up, the generation of fish eyes, and the decrease in transparency upon melt processing the recovery of the multilayer structure including an EVOH layer and a thermoplastic resin layer. In contrast, Comparative Examples 6 through 8 not containing the recycling agent of the present invention did not have sufficient improvement effects in the adhesion of a degraded resin to a screw of a molding machine, the generation of die build-up, the generation of fish eyes, and the decrease in transparency.

Examples 15 Through 18

Other than modifying the type of the modified olefin-based polymer (a-1) used in Example 12 to the description in Table 6, a recycling agent was produced in a same manner as Example 11. Various evaluations were made in a same manner as Example 12 using the recycling agent thus obtained. The results are shown in Table 6. The results of Example 12 are also shown again for reference.

TABLE 6

|  | Example 12 | Example 15 | Example 16 | Example 17 | Example 18 |
|---|---|---|---|---|---|
| Recycling Agent |  |  |  |  |  |
| Modified Olefin-Based Polymer (a-1) | (a-1)-1 | (a-1)-2 | (a-1)-3 | (a-1)-4 | (a-1)-5 |
| Terminal Functional Group Containing Polymer (a-2) | (a-2)-5 | (a-2)-5 | (a-2)-5 | (a-2)-5 | (a-2)-5 |
| Amount of Added Polymer (a-2) (mol %) | 10 | 10 | 10 | 10 | 10 |
| Alkali Metal Compound (B) | (B)-1 | (B)-1 | (B)-1 | (B)-1 | (B)-1 |
| Amount of Added Alkali Metal Compound (B) (mol %) | 3 | 3 | 3 | 3 | 3 |
| Presence of Unreacted Terminal Functional Group Containing Polymer (a-2) Polymer in Recycling Agent | Not Found | Not Found | Not Found | Not Found | Not Found |
| Amount of Reaction of Terminal Functional Groups Based on Amount of Unsaturated Carboxylic Acid Groups (mol %) | 10 | 10 | 10 | 10 | 10 |
| Amount of Blended Recycling Agent in Recovery (mass %) | 2.5 | 2.5 | 2.5 | 2.5 | 2.5 |
| Evaluation Results |  |  |  |  |  |
| Screw Adhesion Amount (mg) | 116 | 143 | 154 | 140 | 130 |
| Die build-up Generation Amount (mg) | 13 | 18 | 21 | 19 | 22 |
| Fish Eyes (number) | 2 | 3 | 6 | 6 | 6 |
| Transparency (Haze) | 17.5 | 18.1 | 18.6 | 19.0 | 19.1 |

Examples 19 Through 20 and Comparative Example 9

Other than modifying the type of the polymer (a-2) containing a terminal functional group used in Example 12 to the description in Table 7, a recycling agent was produced in a same manner as Example 12. Various evaluations were made in a same manner as Example 12 using the recycling agent thus obtained. The results are shown in Table 7.

Example 21

Other than using the alkali metal compound (B)-2 instead of the alkali metal compound (B)-1 in Example 12, a recycling agent was produced in a same manner as Example 12. Various evaluations were made in a same manner as Example 11 using the recycling agent thus obtained. The results are shown in Table 7. The results of Example 12 are also shown again for reference.

TABLE 1

|  | Example 12 | Example 19 | Example 20 | Comparative Example 9 | Example 21 |
|---|---|---|---|---|---|
| Recycling Agent |  |  |  |  |  |
| Modified Olefin-Based Polymer (a-1) | (a-1)-1 | (a-1)-1 | (a-1)-1 | (a-1)-1 | (a-1)-1 |
| Terminal Functional Group Containing Polymer (a-2) | (a-2)-5 | (a-2)-6 | (a-2)-7 | (a-2)' | (a-2)-5 |
| Amount of Added Polymer (a-2) (mol %) | 10 | 10 | 10 | 10 | 10 |
| Alkali Metal Compound (B) | (B)-1 | (B)-1 | (B)-1 | (B)-1 | (B)-2 |
| Amount of Added Alkali Metal Compound (B) (mol %) | 3 | 3 | 3 | 3 | 3 |
| Presence of Unreacted Terminal Functional Group Containing Polymer (a-2) Polymer in Recycling Agent | Not Found | Not Found | Not Found | Not Found | Not Found |
| Amount of Reaction of Terminal Functional Groups Based on Amount of Unsaturated Carboxylic Acid Groups (mol %) | 10 | 10 | 10 | 10 | 10 |

TABLE 1-continued

|  | Example 12 | Example 19 | Example 20 | Comparative Example 9 | Example 21 |
|---|---|---|---|---|---|
| Amount of Blended Recycling Agent in Recovery (mass %) | 2.5 | 2.5 | 2.5 | 2.5 | 2.5 |
| Evaluation Results |  |  |  |  |  |
| Screw Adhesion Amount (mg) | 116 | 125 | 164 | 199 | 121 |
| Die build-up Generation Amount (mg) | 13 | 17 | 19 | 46 | 14 |
| Fish Eyes (number) | 2 | 3 | 5 | 12 | 4 |
| Transparency (Haze) | 17.5 | 17.9 | 18.3 | 23.0 | 17.9 |

From Table 7, it is understood that Comparative Example 9 using the trimethylolpropane (a-2)' having a molecular weight of less than 1,500 instead of the polymer (a-2) containing a terminal functional group had poorer improvement effects in the adhesion to a screw, the generation of die build-up, the generation of fish eyes, and the decrease in transparency.

Examples 22 through 25

Other than modifying the ratio of hydroxyl groups in the polymer (a-2)-5 containing a terminal functional group and the ratio of the alkali metal compound (B)-1 respectively based on the acid anhydride groups in the modified olefin-based polymer (a-1)-1 in Example 12 to the description in Table 8, a recycling agent was produced in a same manner as Example 12. Various evaluations were made in a same manner as Example 12 using the recycling agent thus obtained. The results are shown in Table 8. The results of Example 12 are also shown again for reference.

TABLE 8

|  | Example 12 | Example 22 | Example 23 | Example 24 | Example 25 |
|---|---|---|---|---|---|
| Recycling Agent |  |  |  |  |  |
| Modified Olefin-Based Polymer (a-1) | (a-1)-1 | (a-1)-1 | (a-1)-1 | (a-1)-1 | (a-1)-1 |
| Terminal Functional Group Containing Polymer (a-2) | (a-2)-5 | (a-2)-5 | (a-2)-5 | (a-2)-5 | (a-2)-5 |
| Amount of Added Polymer (a-2) (mol %) | 10 | 5 | 15 | 50 | 50 |
| Alkali Metal Compound (B) | (B)-1 | (B)-1 | (B)-1 | (B)-1 | (B)-1 |
| Amount of Added Alkali Metal Compound (B) (mol %) | 3 | 0 | 5 | 3 | 12 |
| Presence of Unreacted Terminal Functional Group Containing Polymer (a-2) Polymer in Recycling Agent | Not Found | Not Found | Not Found | Found | Not Found |
| Amount of Reaction of Terminal Functional Groups Based on Amount of Unsaturated Carboxylic Acid Groups (mol %) | 10 | 5 | 15 | 46 | 50 |
| Amount of Blended Recycling Agent in Recovery (mass %) | 2.5 | 2.5 | 2.5 | 2.5 | 2.5 |
| Evaluation Results |  |  |  |  |  |
| Screw Adhesion Amount (mg) | 116 | 130 | 138 | 141 | 149 |
| Die build-up Generation Amount (mg) | 13 | 24 | 31 | 40 | 44 |
| Fish Eyes (number) | 2 | 7 | 10 | 9 | 9 |
| Transparency (Haze) | 17.5 | 19.2 | 18.3 | 21.9 | 22.6 |

As demonstrated in Examples, upon melt processing a recovery of a multilayer structure including an EVOH layer and a thermoplastic resin layer, the recycling agent of the present invention inhibits the adhesion of a degraded resin to a screw of a molding machine and the generation of die build-up, so that it enables to produce molded articles using the recovery over a long period of time. In addition, the multilayer structure of the present invention is inhibited in the generation of fish eyes and the decrease in transparency, so that it is applicable to various uses, such as a packaging material for foods, medicines, and the like.

The invention claimed is:

1. A recycling agent, comprising:
a polymer (A) obtained by reacting a modified olefin-based polymer (a-1) with a polymer (a-2) comprising a terminal functional group, and
an alkali metal compound (B)
wherein
the modified olefin-based polymer (a-1) is a polymer modified with from 0.01 to 2 mass % of an unsaturated carboxylic acid or a derivative thereof, and
the polymer (a-2) is a polymer comprising a terminal functional group, capable of reacting with the modified olefin-based polymer (a-1), at both ends or one end thereof and has a number average molecular weight from 1,500 to 100,000.

2. The recycling agent of claim 1, wherein an amount of the terminal functional group is from 0.1 to 50 mol % in the polymer (a-2) based on an amount of a functional group derived from the unsaturated carboxylic acid or the derivative thereof in the modified olefin-based polymer (a-1).

3. The recycling agent of claim 1, wherein the polymer (a-2) has an SP value, calculated from the Fedors equation, of from 9 to 15 $(cal/cm^3)^{1/2}$.

4. The recycling agent of claim 1, wherein the terminal functional group is a hydroxyl group.

5. The recycling agent of claim 1, wherein the polymer (a-2) comprises the terminal functional group only at one end thereof.

6. The recycling agent of claim 5, wherein the polymer (a-2) is polyglycol having one end capped with an ether or an ester.

7. The recycling agent of claim 1, wherein the alkali metal compound (B) is present in a ratio from 0.1 to 10 mol % in terms of alkali metal elements based on a functional group derived from the unsaturated carboxylic acid or the derivative thereof in the modified olefin-based polymer (a-1).

8. The recycling agent of claim 1, further comprising an additional unmodified olefin-based polymer.

9. The recycling agent of claim 1, wherein the unreacted polymer (a-2) is consumed in the reacting of the modified olefin-based polymer (a-1) with the polymer (a-2).

10. A mixed resin, comprising:
a recovery of a multilayer structure comprising an ethylene-vinyl alcohol copolymer layer and a thermoplastic resin layer; and
0.5 to 10 mass % of the recycling agent of claim 1.

11. A multilayer structure, comprising at least one layer obtained by melt processing the mixed resin of claim 10.

12. A method of producing the recycling agent of claim 1, the method comprising melt kneading the modified olefin-based polymer (a-1) and the polymer (a-2), wherein the modified olefin-based polymer (a-1) and the polymer (a-2) are melt kneaded in the presence of the alkali metal compound (B).

13. The method of claim 12, wherein from 0.1 to 200 parts by mass of the polymer (a-2) is melt kneaded based on 100 parts by mass of the modified olefin-based polymer (a-1).

14. The recycling agent of claim 1, wherein the alkali metal compound is a hydroxide, a carbonate, or a lower fatty acid salt of an alkali metal.

15. The recycling agent of claim 1, wherein the alkali metal compound is selected from the group consisting of sodium hydroxide, potassium hydroxide, sodium carbonate, sodium hydrogencarbonate, potassium hydrogencarbonate, potassium acetate, potassium butyrate, and mixtures thereof.

16. The recycling agent of claim 1, wherein the alkali metal compound is potassium acetate.

17. The recycling agent of claim 1, wherein the alkali metal compound is a fatty acid salt of an alkali metal having a carbon number of 7 or less.

18. The recycling agent of claim 7, wherein the alkali metal compound is a hydroxide, a carbonate, or a lower fatty acid salt of an alkali metal.

19. The recycling agent of claim 7, wherein the alkali metal compound is selected from the group consisting of sodium hydroxide, potassium hydroxide, sodium carbonate, sodium hydrogencarbonate, potassium hydrogencarbonate, potassium acetate, potassium butyrate, and mixtures thereof.

* * * * *